United States Patent
Hur

[11] Patent Number: 5,449,143
[45] Date of Patent: Sep. 12, 1995

[54] AIR VENT CONTROL APPARATUS

[75] Inventor: Nam S. Hur, Suwon, Rep. of Korea

[73] Assignee: Samsung Electronics Co., Ltd., Suwon, Rep. of Korea

[21] Appl. No.: 187,862

[22] Filed: Jan. 28, 1994

[30] Foreign Application Priority Data

Jan. 30, 1993 [KR] Rep. of Korea ............... UM93-1108

[51] Int. Cl.[6] .............................................. F16K 31/44
[52] U.S. Cl. .......................................... 251/77; 251/75; 251/129.12; 137/601
[58] Field of Search .............. 137/77, 79, 599, 601; 251/288, 129.11, 129.12, 77, 75

[56] References Cited

U.S. PATENT DOCUMENTS

| | | | |
|---|---|---|---|
| 3,361,240 | 1/1968 | Cagle | 251/79 |
| 3,604,458 | 9/1971 | Silvery | 137/601 |
| 4,347,869 | 9/1982 | Strobel et al. | 137/599 |
| 4,463,930 | 8/1984 | Vamvakas | 251/129.12 |
| 4,619,437 | 10/1986 | Williams et al. | 251/79 |
| 5,159,984 | 11/1992 | Janich | 137/599 |

Primary Examiner—A. Michael Chambers
Attorney, Agent, or Firm—Burns, Doane, Swecker & Mathis

[57] ABSTRACT

An air vent includes a louver blade rotatable to adjusted positions by a motor. A control mechanism which connects the motor with the louver blade includes a control member connected to the motor, and a rotation transmitting member connecting the control member to the louver blade. The control member and rotation transmitting member are rotatable about a common axis. The rotation transmitting member and control member are capable of limited relative rotation in the event that an unwanted external force is applied to the louver blade, in order to isolate the motor from that external force. Spring-biased return blocks engage an elliptically shaped portion of the rotation transmitting member to return the louver blade to a prescribed angular relationship to the control member when the external force is relieved.

10 Claims, 6 Drawing Sheets

AIR VENT CONTROL APPARATUS

BACKGROUND OF THE INVENTION

This invention relates to an air vent control apparatus, more particularly an air vent control apparatus comprised of a drive motor and louver blade an undesired external force applied to the louver blade being transmitted to the motor.

A conventional air vent control apparatus is shown in FIGS. 5 and 6. As a motor 51 operates, a crank arm 54 which is provided in a slide perforation 53 of a link 52 is rotated. A first slide member 56 and a second slide member 57 are provided above and below the crank arm 54, respectively. The first and second slide members 56, 57 are interconnected by a resilient member 55 in order to achieve their rectilinear motion with the simultaneous motion of the link 52. The rectilinear motion of the link 52 produces a rotational movement of shafts 59 which are respectively connected to blades (louvers) 58, so that the blades 58 move within the predetermined range. When an incidental force is applied to the blade 58, the shaft 59 is rotated and the link 52 is moved along the direction of arrow "A". Protrusions 60 which are respectively provided adjacent both sides of the crank arm 54 and integrally formed to the link 52 push the second slide member 57 along the direction of arrow "A". Hence, the first slide member 56 bearing against the upper portion of the crank arm 54 remains in the steady position and the resilient member 55 is extended. Therefore, the incidental force applied to the blade 58 is not transmitted to the crank arm 54, thereby preventing the movement of the motor 51 from being interrupted. Further, when the external force is no longer applied, the link 52 is moved upward by the restoring force of the resilient member 55. The blades 58 return to the intended position which is in the free force position.

Because the above air vent control apparatus is operated through a complex of components, the whole structure is complicated and further the necessary occupied space is generally increased, and since excessive parts are used, the efficiency is lowered and as the product cost is increased.

SUMMARY OF THE INVENTION

An object of the present invention is to provide an air vent control apparatus whose structure is simple and occupies less space and has a greater efficiency and lower production cost.

Another object of the present invention is to provide an air vent control apparatus in which, when an incidental external force is applied to a louver blade, the force is not transmitted to the motor, thereby preventing the motor from being damaged.

Another object of the present invention is to provide an air vent control apparatus in which, when the external incidental force is removed, the affected blade will return to the intended position.

According to the present invention, the air vent control apparatus comprises a power generating means which generates the rotating force and an interrupting means in which the power of the power generating means can be transmitted to an air vent control member, or the power can be prevented from being transmitted to a blade when an external incidental force is against the intended moving direction of the blade is applied to the blade. Further, the interrupting means comprises a restoring means which rotates along the rotation of the air vent control member when an incidental force is applied and a resilient member which applies the resilient force to the restoring means. The restoring means moves within a range of 80 degrees in one hand direction or an other. The resilient force of the resilient member is greater than the rotation resistance force of the restoring member and is less than the rotation force of the power generating means.

When the motor is operated; the restoring member, which is interconnected to the air vent control member, is moved simultaneously with the rotation of the restoring member and restricted by the resilient member. Thus, the air vent control member moves within the allowable range of rotation. The air vent control member is subjected to an unintended external force in the direction opposite to the swinging direction of the air vent control member. Simultaneously, the restoring member receives the unintended external force and thus the force is not be transmitted to the power generating means. The rotation of the restoring member may be performed within the range in which the resilient member can push the restoring member. When the force is removed from the air vent control member, the restoring member returns to its intended position and also the air vent control member returns to its intentional position. Further, in the event that the restoring member rotates beyond the allowable range of rotation, the stopper resists the further advance of the restoring member.

DESCRIPTION OF THE PREFERRED EMBODIMENTS

Figure 1:
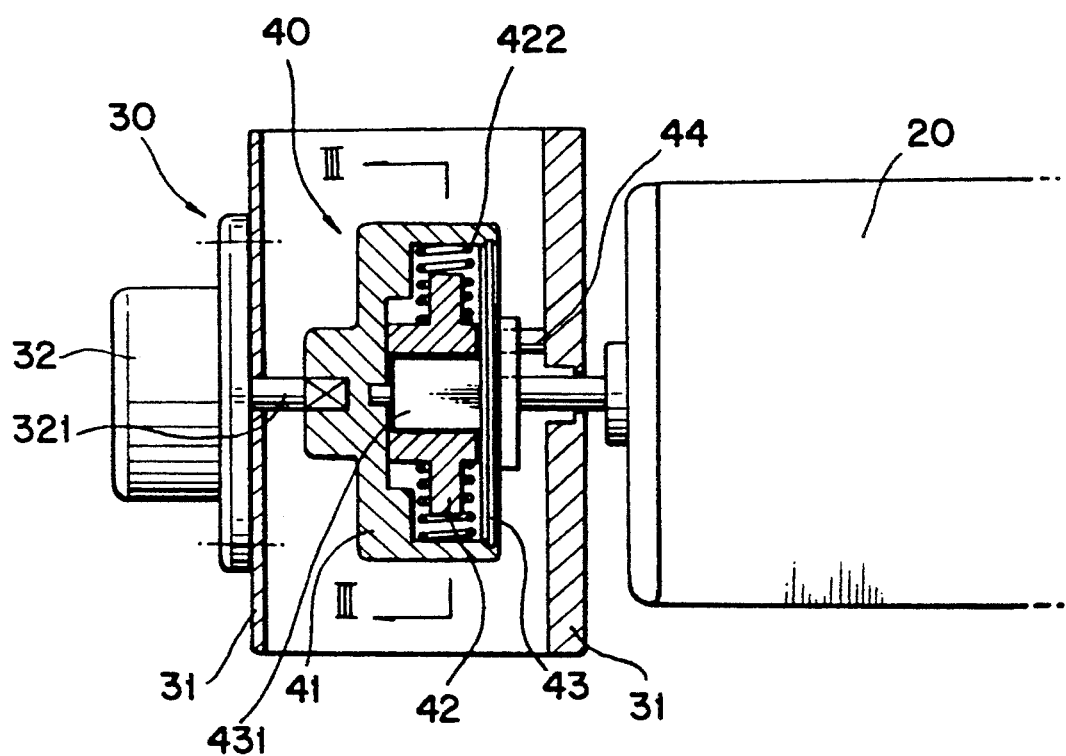
FIG. 1 is a longitudinal sectional view of an air vent control apparatus according to the present invention.
Figure 2:
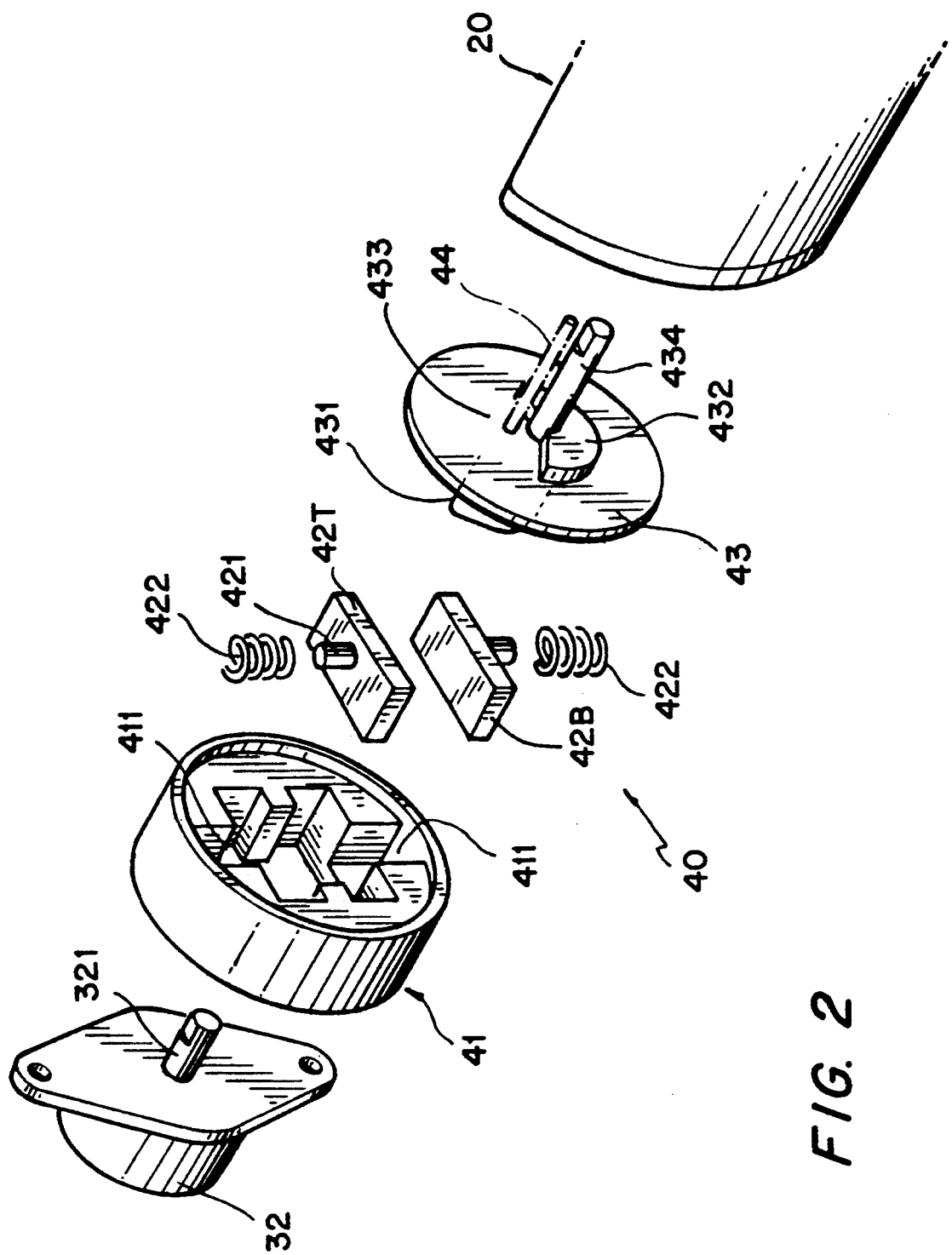
FIG. 2 is a perspective exploded view of the air vent control apparatus.
Figure 3:
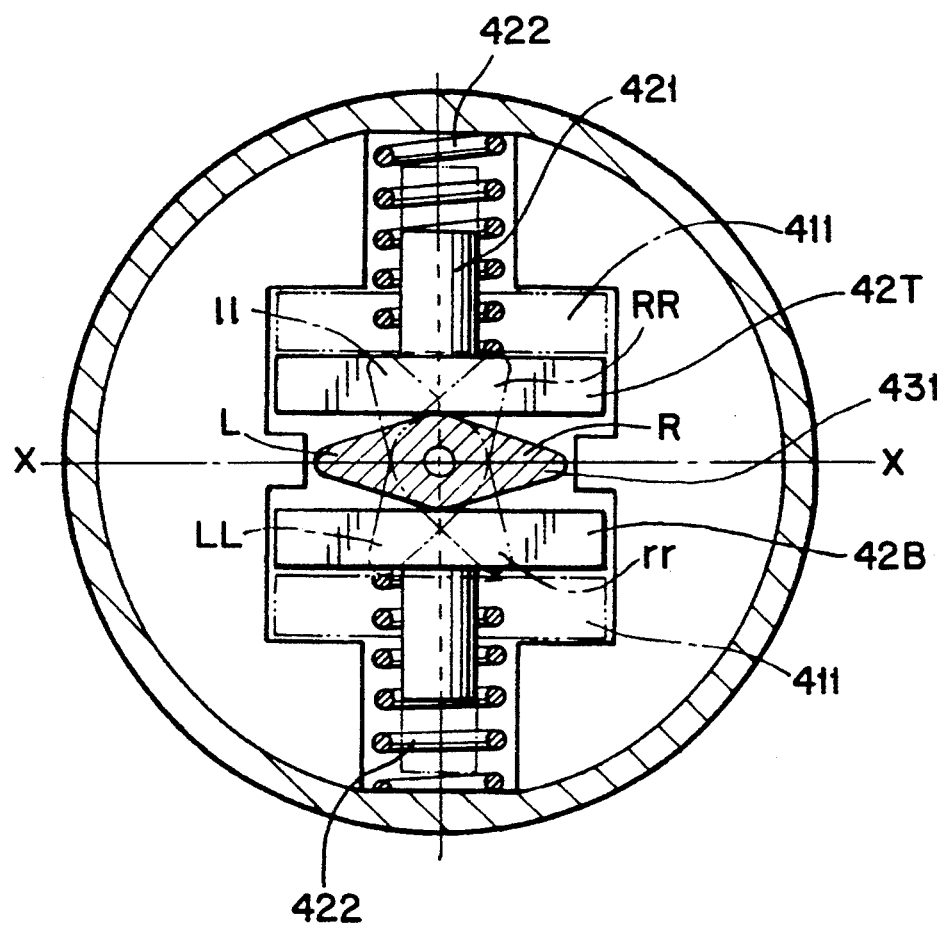
FIG. 3 is a sectional view taken along the line III—III of FIG. 1.

FIGS. 1 to 3 illustrate the air vent control apparatus in accordance with one embodiment of the present invention.

Figure 4:
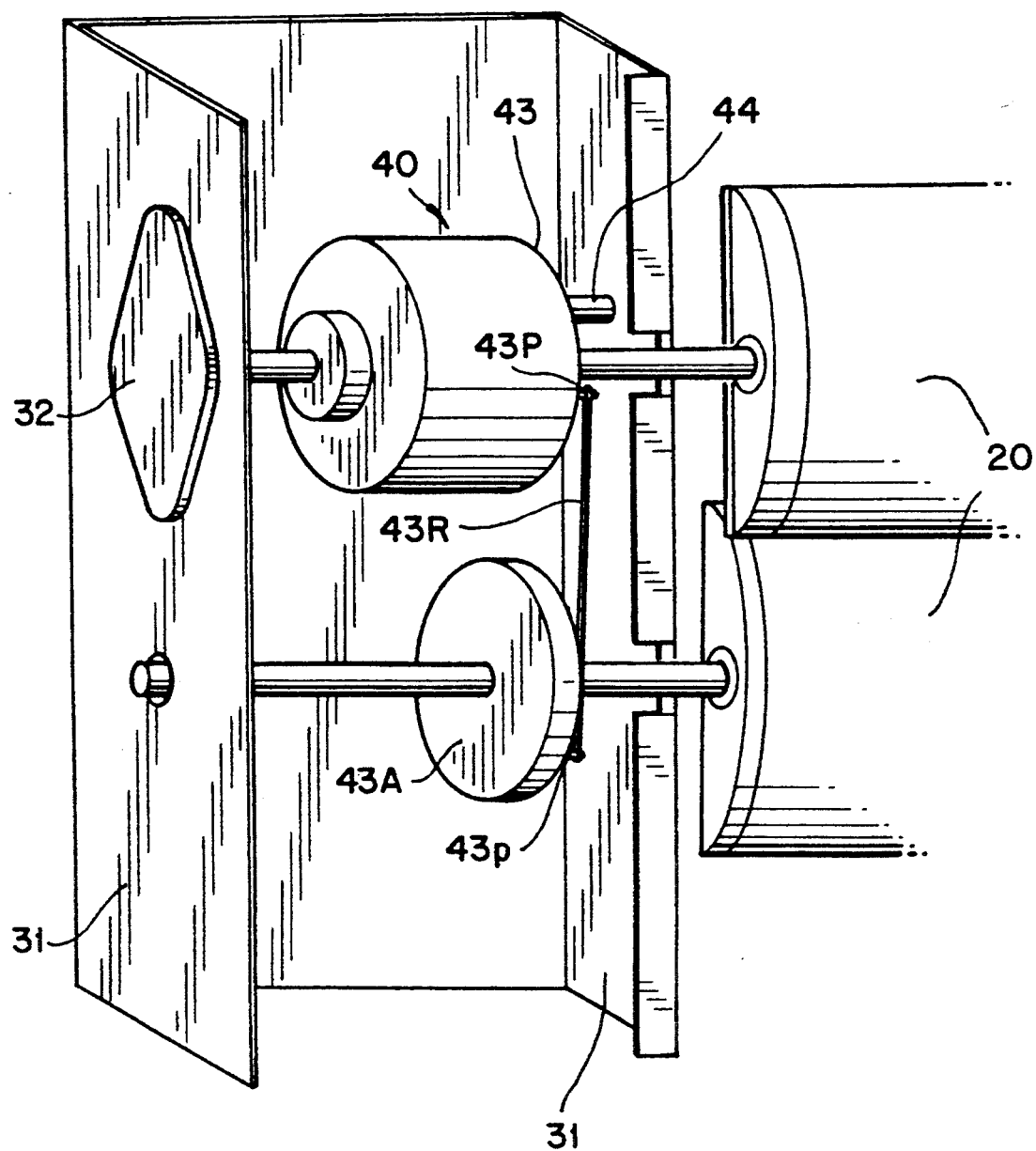
FIG. 4 is a perspective view of another preferred embodiment of the air vent control apparatus according to the present invention.

The air vent control apparatus includes an operating member 30 which is coaxially mounted on one end of a louver 20 installed in a frame of an air vent member (not shown). At the one end of the louver 20 a bracket 31 with the shape shown in FIG. 4 is provided. At the portion of the bracket 31 opposite to the louver 20 is mounted a motor 32 with its axle coaxially disposed with the shaft of the louver 20. Between the motor 32 and the louver 20 an interrupting member or connecting assembly 40 is disposed through which the rotating force of the motor 32 is directly transmitted to the louver 20 and through which an unintended external force applied to the louver 20 is not transmitted to the motor 32.

The interrupting member 40 includes a control member or supporter 41 which has a round shape, one side end of which is opened and in which a pair of operating chambers 411 are vertically disposed. The operating chambers 411 have a pair of blocks 42T, 42B therein respectively. The respective block has a pin 421 which extends outward from the outer surface of the block 42T, 42B and an expansion spring 422 which is disposed on the outer surface of the block 42T, 42B for applying a resilient force to the block 42T, 42B. The force of the spring 422 is greater than that of the normal rotating resistance force of the louver 20 and is less than that of the rotating force of the motor 32. A rotating member 43 is provided at the opened end of the supporter 41. At the center of one side of the rotating member 43 a restoring member 431 is provided, while at the center of the other side thereof a guide plate 432 is integrally provided. The guide plate 432 has a guide recess 433 which comprises about a 160 degree arc cut away. The restoring member 431 has an elliptical cross sectional shape, and its long transverse axis X—X (FIG. 3) is parallel to the transverse axis of the end section of the louver 20 (FIG. 2).

A stopper 44 is mounted on the inner side of the bracket 31 adjacent to the louver 20. The stopper 44 projects toward the rotating member to a location centrally of the guide recess 433 or at about the 80 degree point distance from the beginning edge of the 160 degree cutaway. In FIG. 1, the shaft 321 of the motor 32 is mounted centrally at the left side of the interrupting member 40, and a shaft 434 projecting axially from the rotating member 43 is mounted at the end of the louver 20. The members 43, 431, and 434 constitute a rotation transmitting assembly which transmits rotation from the control member 41 to the louver blade.

Figure 5:
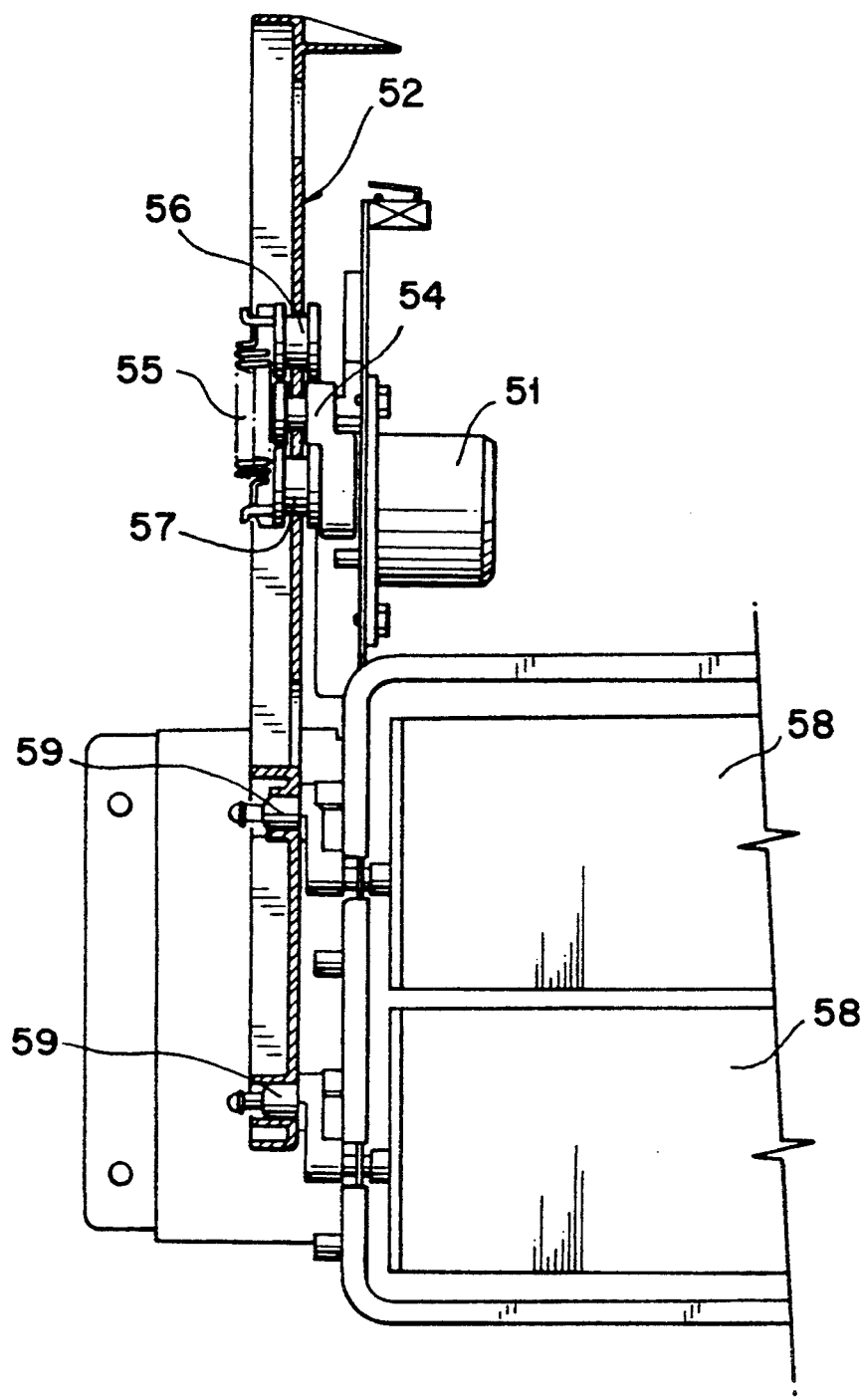
FIG. 5 is a front sectional view of an air vent control apparatus according to prior art.
Figure 6:
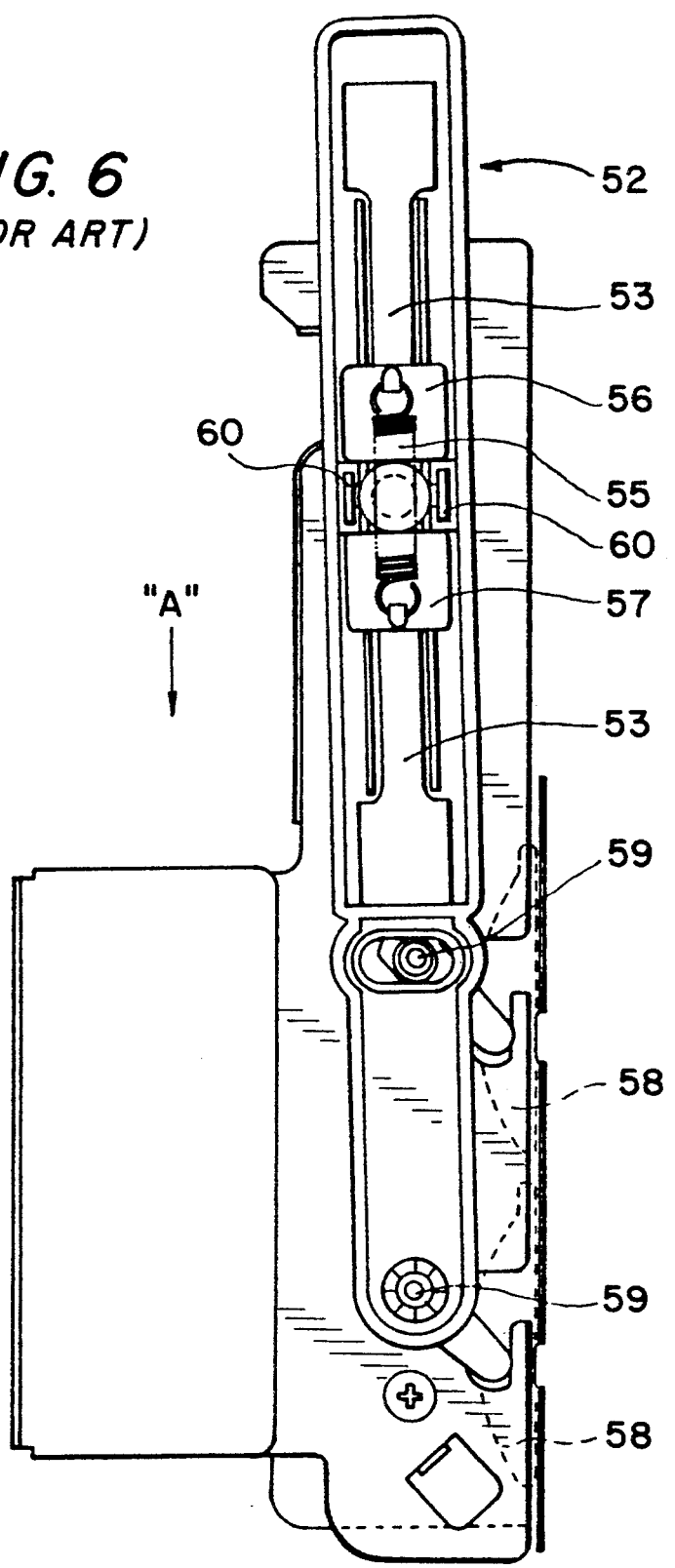
FIG. 6 is a side view of the air vent control apparatus depicted in FIG. 5.

To control the vent air by the air vent control apparatus, the power is initially applied to the motor 32, and the supporter 41 is rotated by the shaft 321 of the motor 32. The springs 422 constantly push the corresponding blocks 42T, 42B radially inwardly toward one another to secure the restoring member 431 (see FIG. 5). As the supporter 41 is rotating, the restoring member 431 is simultaneously rotating and thus rotates the rotating member 43. Also, the louver 20, which is connected to the rotating member 43, is moving. The allowable movement limit of the louver 20 is determined by the motor 32 under the command of the control unit (not shown).

When an inadvertent external force is applied against the intended rotation direction of the louver 20, the rotating member 43 is moved along with the louver in the direction of the external force and relative to the supporter 41. As shown in broken lines in FIG. 3, the restoring member 431 has been moved in a counter-clock direction whereby the portion 'R' of the restoring member 431 has been moved to the place 'RR' and it simultaneously pushes the block 42T upward. Also, the portion 'L' of the restoring member 431 has been moved to the place 'LL' and it simultaneously pushes the block 42B downward. Alternatively, the restoring member 431 could have been moved in a clockwise direction wherein the portion 'R' of the restoring member 431 would have been moved to the place 'rr' and simultaneously the portion 'L' of the restoring member 431 would have been moved to the place 'll'.

After the restoring member 431 has been moved in either direction, the springs 422 are compressed so as to rotate only with the member 431. The rotating guide plate 432 shown in FIG. 2 is rotated simultaneously with the restoring member 431. The range of allowable rotation is determined by the degree of the cutaway of the guide recess 433. That is, since the stopper 44 is provided at the center of the guide recess 433, the louver 20 cannot be rotated beyond about a 160 degree range.

Since only the restoring member 431 is rotated and the supporter 41 cannot be rotated (due to the contact of the guide flow 432 with the stopper 44), the external force cannot be transmitted to the motor 32. Thereafter, the external force is no longer applied to the louver 20 and the upper and the lower springs 422 push the corresponding blocks 42T, 42B toward the restoring member 431 so as to return the restoring member 431 to the 'L-R' position. The springs 422 and blocks 42T, 42B thus constitute a biasing mechanism which returns the louver when the external force is relieved.

In the above description, while only a single louver 20 is described as moving, a plurality of louvers 20 can be installed as shown in FIG. 4. This is achieved by using the following members; the rotating member 43 is directly interconnected to the motor 32 through the supporter 41. Another rotating member 43A which is not directly interconnected to the motor 32 is interlinked to the rotating member 43 by link 43R using the pin 43P.

What is claimed is:

1. An air vent apparatus comprising:
a louver blade rotatably mounted for adjustment to different rotary positions; and
control means for controlling the rotary positioning of said louver blade, comprising:
power generating means for generating a rotary force, and
connecting means connecting said power generating means with said, louver blade for rotating said louver blade in response to the generation of said rotary force, said connecting means including:
a control member mounted for rotation about an axis and operably connected to said power generating means to be rotated thereby,
a rotation transmitting member mounted for rotation about said axis and operably connected to both said control member and said louver blade for transmitting rotary force from said control member to said louver blade, said rotation transmitting member being rotatable relative to said control member within a limited range of rotation and thereby permit limited relative rotation between said louver blade and said power generating means in response to the application of an external force to said louver blade, said rotation transmitting member including a restoring element rotatable about said axis and being of non-circular cross section, and
biasing means for biasing said rotation transmitting member to a prescribed angular relationship to said control member, said rotation transmitting member being disposed out of said prescribed angular relationship in response to the occurrence of said relative rotation and being returned to said prescribed angular relationship by said biasing means when said external force is relieved, said biasing means comprising at least one spring-biased block movable radially for imposing a rotational force against said restoring element.

2. The air vent apparatus according to claim 1, wherein said power generating means comprises a motor having an output shaft, said output shaft and said louver blade being rotatable about said common axis.

3. The air vent apparatus according to claim 1 further including stop means for limiting the amount of relative rotation between said rotation transmitting member and said control member.

4. The air vent apparatus according to claim 3, wherein said stop member is arranged to be selectively engaged by circumferentially spaced surfaces of said rotation transmitting member.

5. The air vent apparatus according to claim 3, wherein said stop means is arranged to limit said relative rotation to about 80 degrees in each direction from said prescribed angular relationship.

6. The air vent apparatus according to claim 1, wherein said control member forms a recess open in an axial direction toward said rotation transmitting member, said restoring element extending into said recess, said spring-biased being disposed in said recess.

7. The air vent apparatus according to claim 6, wherein said biasing means comprises two said spring-biased blocks disposed radially opposite one another on opposite sides of said restoring element.

8. The air vent apparatus according to claim 1, wherein said restoring element has a generally elliptical shape.

9. The air vent apparatus according to claim 1, wherein the force of said biasing means is greater than a normal rotational resistance to rotation of said louver blade in the absence of the external force, and is less than the rotary force of said power generating means.

10. The air vent apparatus according to claim 1, wherein said louver blade constitutes a first louver blade, there being further provided a second louver blade rotatable about an axis oriented parallel to an axis of rotation of said first louver blade, and further including means connecting said second louver blade to said rotation transmitting member.

* * * * *